(12) United States Patent
Huang et al.

(10) Patent No.: US 6,609,866 B2
(45) Date of Patent: Aug. 26, 2003

(54) EXPANDABLE METAL BODY FOR AN EXPANSION BOLT

(75) Inventors: Pan-Ching Huang, Changhua (TW); Chih-Tsung Chen, Changhua (TW)

(73) Assignee: Joker Industrial Co., Ltd., Changhua (TW)

( * ) Notice: Subject to any disclaimer, the term of this patent is extended or adjusted under 35 U.S.C. 154(b) by 0 days.

(21) Appl. No.: 09/955,184

(22) Filed: Sep. 19, 2001

(65) Prior Publication Data
US 2003/0053881 A1 Mar. 20, 2003

(51) Int. Cl.[7] ................................................ F16B 13/04
(52) U.S. Cl. .............................. 411/34; 411/30; 411/61; 411/437
(58) Field of Search ............................. 411/34–38, 30, 411/31, 432, 437, 528, 61

(56) References Cited

U.S. PATENT DOCUMENTS 1,208,999 A * 12/1916 Malaby
1,293,844 A * 2/1919 Malaby
1,295,734 A * 2/1919 Greubel
2,762,252 A * 9/1956 Karitzky
3,362,278 A * 1/1968 Munse
3,385,156 A * 5/1968 Polos
3,648,335 A * 3/1972 Henning
4,657,456 A * 4/1987 Anquetin

* cited by examiner

*Primary Examiner*—Flemming Saether
(74) *Attorney, Agent, or Firm*—Troxell Law Office PLLC

(57) ABSTRACT

An expandable body of expansion bolt comprises an upper section having a hollow upper circular member including a cut and a connection member coupled to the upper section, and a hollow lower circular member including a cut and a dent with the connection member received therein; a middle section having a plurality of parallel longitudinal slots; and a lower section having a plurality of substantially rectangular members on a lower portion. In operation, a piece of object is fastened between lower portion of the lower section and the middle section by driving the bolt in response to an insertion of the bolt through the body and the piece of object. A variety of configurations of upper section and circular members are provided for enhancing the positioning of the expandable body and guiding of the thread of bolt.

5 Claims, 12 Drawing Sheets

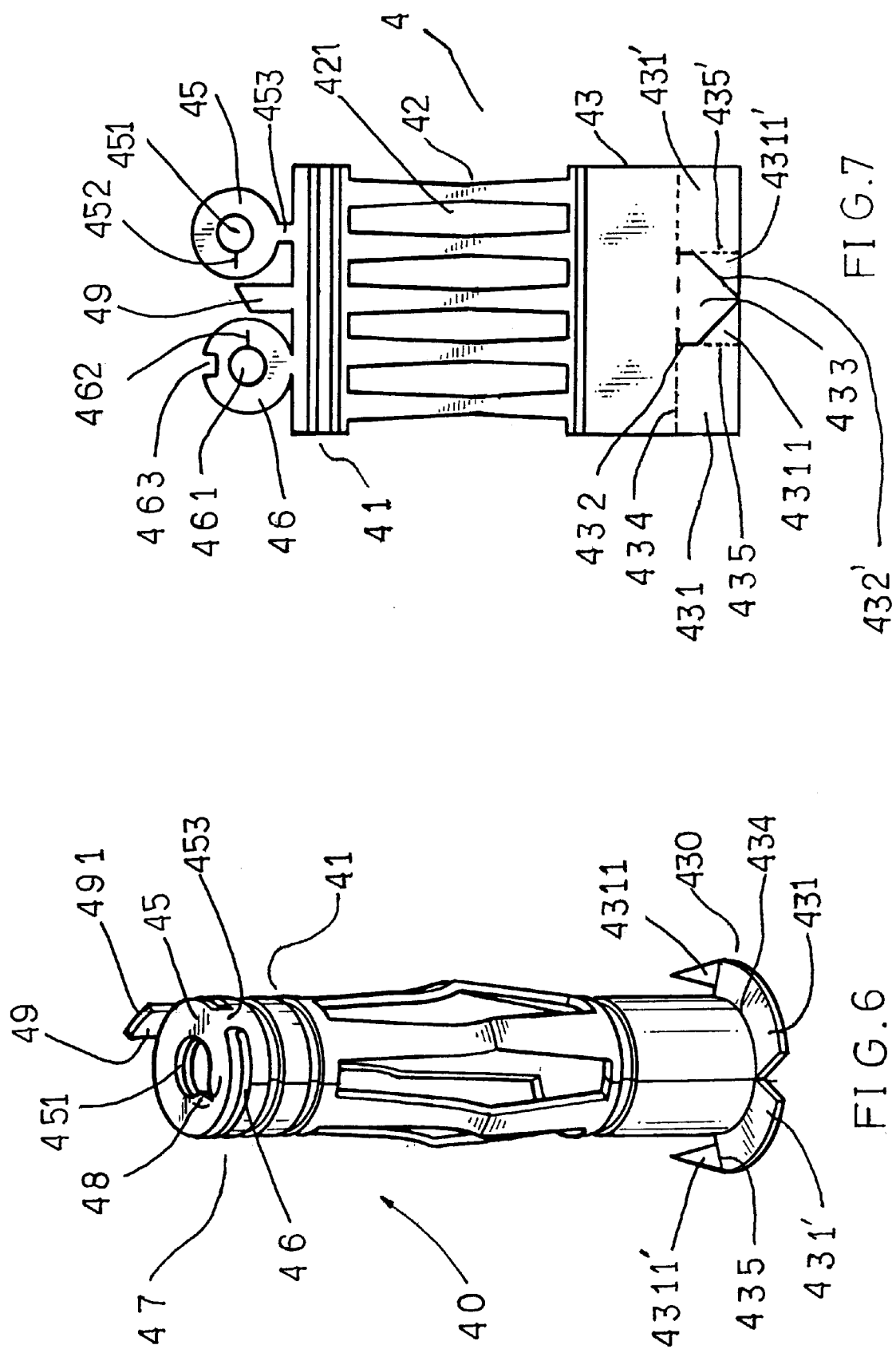

US 6,609,866 B2

EXPANDABLE METAL BODY FOR AN EXPANSION BOLT

FIELD OF THE INVENTION

The present invention relates to expansion bolts and more particularly to an expandable body of an expansion bolt with improved characteristics.

BACKGROUND OF THE INVENTION

An exploded perspective view of an unfinished expandable body 10 of a conventional expansion bolt is shown in FIG. 1. Expandable body 10 comprises a metal expansion section 12 including an upper section 122 welded to a nut 11, a middle section 24 having a plurality of parallel longitudinal slats 124 with an elongate slot 121 disposed between any two adjacent slats 124, and a lower section 123 welded to a base 13. Once expandable body 10 is formed, a bolt may insert through base 13, enclosed by middle section 24, nut 11 (to form as an expansion bolt), and a piece of object for threadedly securing the expansion bolt to the piece of object. However, the previous design suffered from several disadvantages. For example, the welding processes of nut 11 and base 13 are time consuming and high in manufacturing cost. Further, the structural strength of such welded nut 11 and/or base 13 is not sufficient, resulting in a shortening of the useful life of expansion bolt.

SUMMARY OF THE INVENTION

It is therefore an object of the present invention to provide an expansion bolt including a bolt and an expandable metal body comprising an upper section having a hollow upper circular member including a cut and a connection member coupled to the upper section, and a hollow lower circular member including a cut and a dent with the connection member received therein; a middle section having a plurality of parallel longitudinal slots; and a lower section having a plurality of substantially rectangular members on a lower portion. In operation, a piece of object is fastened between lower portion of the lower section and the middle section by driving the bolt in response to an insertion of the bolt through the body and the piece of object. A variety of configurations of upper section and circular members are provided for enhancing the positioning of the expandable body and guiding of the thread of bolt.

The above and other objects, features and advantages of the present invention will become apparent from the following detailed description taken with the accompanying drawings.

BRIEF DESCRIPTION OF THE DRAWINGS

FIG. 6 is a perspective view of a second preferred embodiment of expandable body of an expansion bolt according to the invention;

FIG. 7 is a perspective view of a metal sheet for manufacturing the FIG. 6 expandable body;

DETAILED DESCRIPTION OF THE PREFERRED EMBODIMENTS

Figure 1:
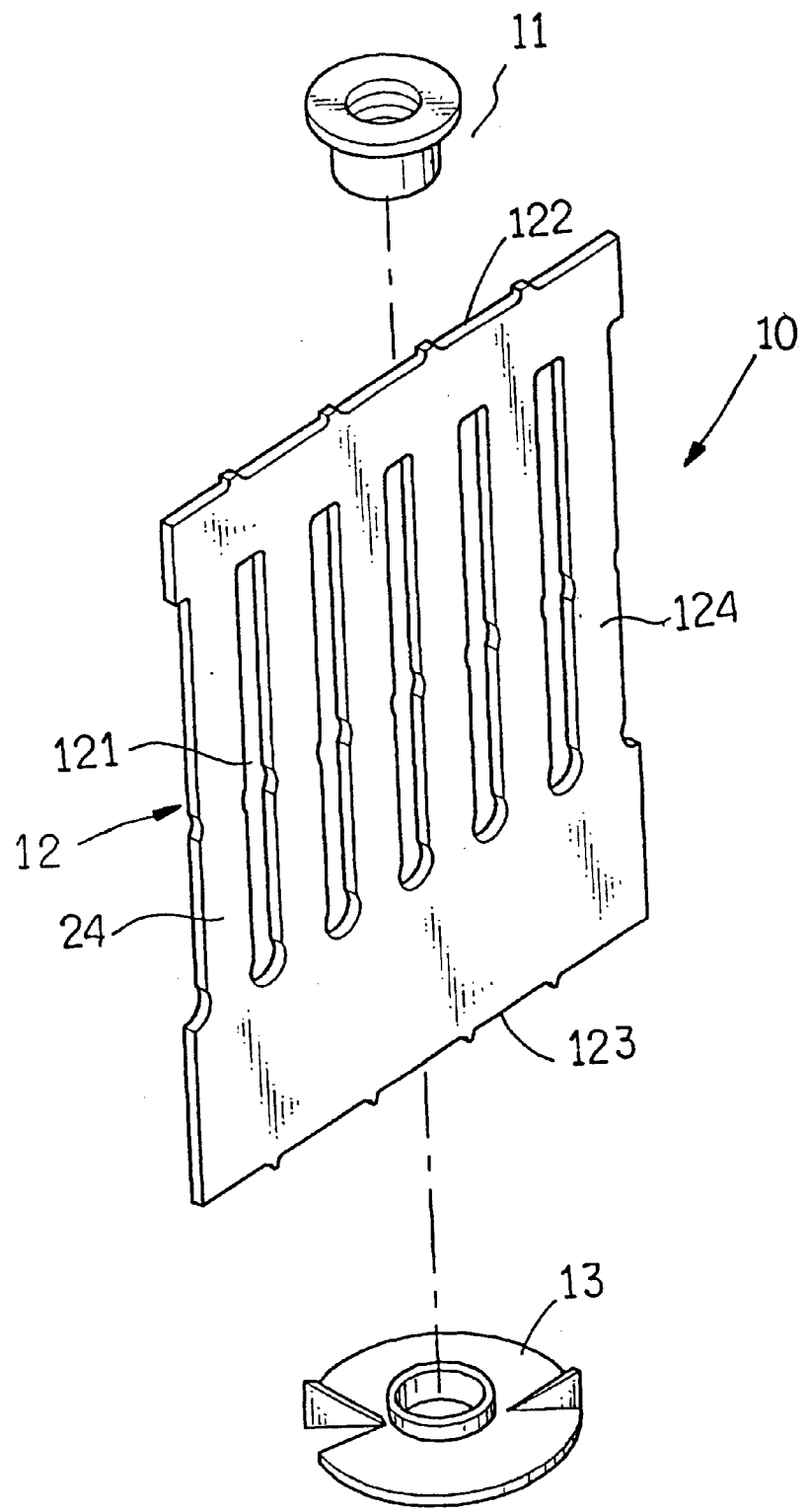
FIG. 1 is an exploded perspective view of an unfinished expandable body of a conventional expansion bolt.
Figure 3:
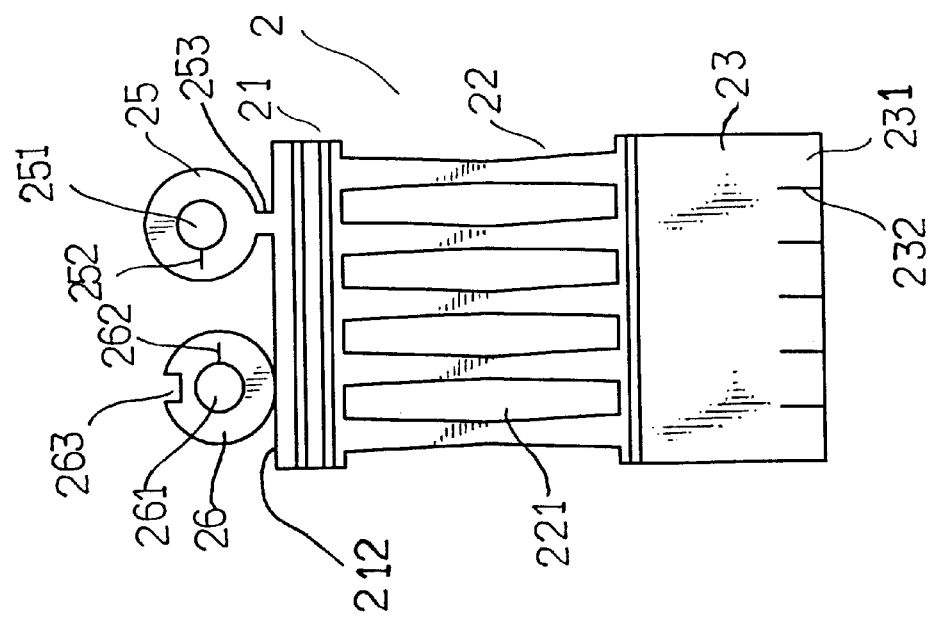
FIG. 3 is a perspective view of a metal sheet for manufacturing the FIG. 2A expandable body.
Figure 2A:
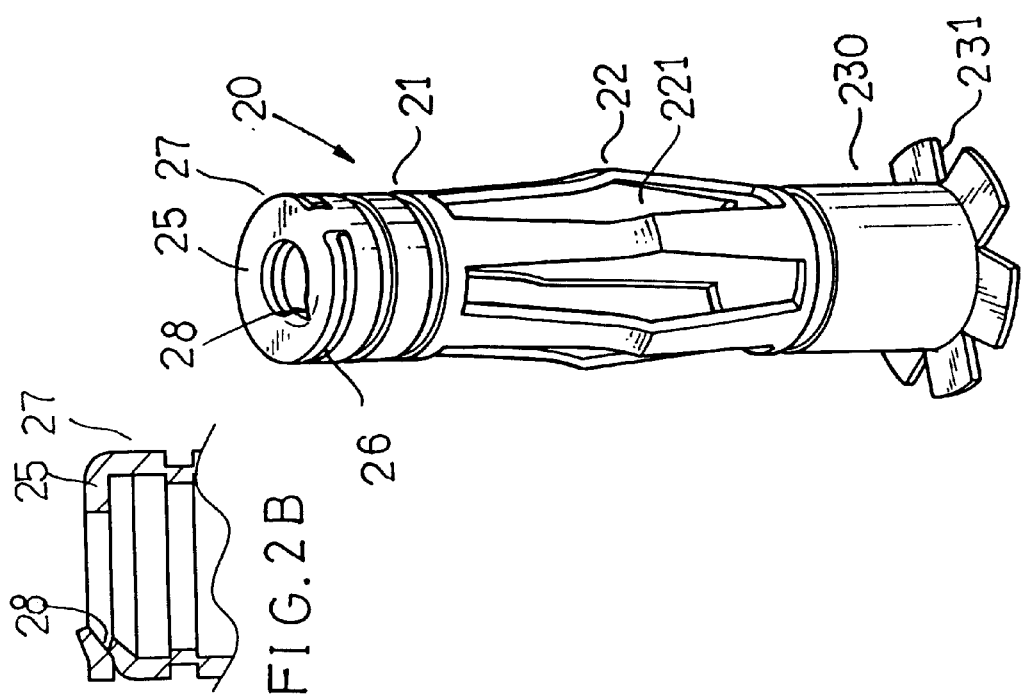
FIG. 2A is a perspective view of a first preferred embodiment of expandable body of an expansion bolt according to the invention.
Figure 2B:
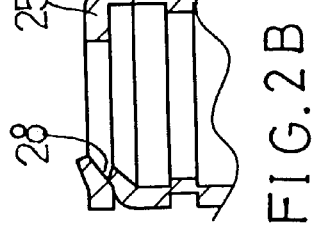
FIG. 2B is a sectional view of upper portion of FIG. 2A.

Referring to FIGS. 2A, 2B and 3, there is shown a first preferred embodiment of expandable body 20 of an expansion bolt constructed in accordance with the invention. In FIG. 3, an extended metal sheet 2 comprises an upper section 21 having an upper circular member 25 including a central hole 251, a cut 252, and a narrow connection member 253 coupled to upper section 21, and a lower circular member 26 including a central hole 261, a cut 262, and a dent 263; a middle section 22 having a plurality of parallel longitudinal slots 221; and a lower section 23 having a plurality of parallel cuts 232 for dividing the lower portion of lower section 23 into a plurality of substantially rectangular members 231. Consequently, an expandable body 20 is formed by shaping the metal sheet 2 as detailed below. First bend two sides of metal sheet 2 toward each other. Next, bend upper and lower circular members 25 and 26 to cause connection member 253 to receive in dent 263, thus forming a top 27. Then bend rectangular members 231 outwardly to form a base 23. Cuts 252 and 262 are bent upwardly slantingly to form a guide 28 for guiding thread of bolt. This forms a complete expandable body 20.

Figure 5:
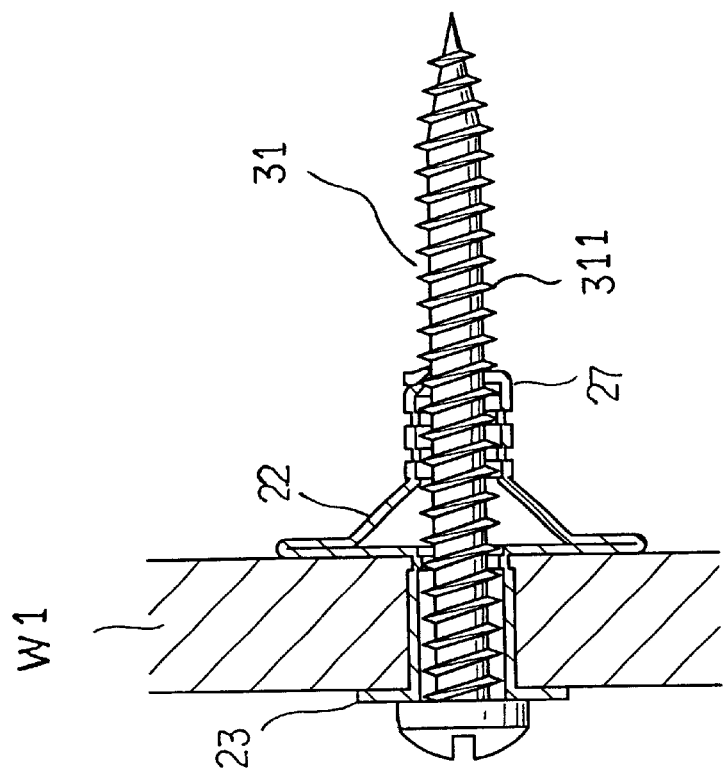
FIG. 5 is a sectional view showing the FIG. 4 expansion bolt fastened to a piece of object.
Figure 4:
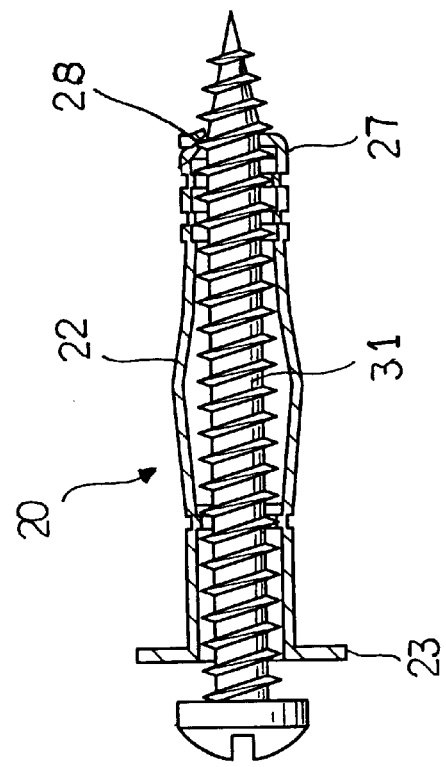
FIG. 4 is a sectional view of FIG. 2A expandable body driven through by a bolt to form an expansion bolt.

Referring to FIGS. 4 and 5, the operation of expansion bolt of the first embodiment of the invention is detailed below. First insert bolt 31 through base 23, middle section 22, top 27 (to form as an expansion bolt), and a piece of object W1. Then use a tool to drive head of bolt 31 to compress middle section 22 to urge against piece of object W1 by threadedly advancing thread 311 with respect to guide 28 until piece of object W1 is secured between base 23 and middle section 22 as shown in FIG. 5.

Referring to FIGS. 6 and 7, there is shown a second preferred embodiment of expandable body 40 constructed in accordance with the invention. In FIG. 7, an extended metal sheet 4 comprises an upper section 41 having an upper circular member 45 having a central hole 451, a radial cut 452, and a connection member 453 for coupling to upper section 41, a lower circular member 46 having a central hole 461, a radial cut 462, and a dent 463 on the outer edge, and a sharp member 49 having a slanted blade 491 disposed between upper and lower circular members 45 and 46 so that sharp member 49 is projected from an outer edge of upper section 41 after being formed; a middle section 42 having a plurality of parallel longitudinal slots 421; and a substantially rectangular lower section 43, on the lower portion, having two rectangular members 431 and 431' and two triangular members 4311 and 4311' disposed between rectangular members 431 and 431' in which the side coupling triangular member 4311 (or 4311') is less than the width of rectangular member 431 (or 431').

Consequently, expandable body 40 is formed by shaping the metal sheet 4 as detailed below. First bend two sides of metal sheet 4 toward each other. Next, bend upper and lower circular members 45 and 46 to cause connection member 453 to receive in dent 463, thus forming a top 47. Then bend rectangular members 431 outwardly to form a base 43 as indicated by dash lines with triangular members 4311 and 4311' bent upwardly. Cuts 452 and 462 are bent upwardly slantingly to form a guide 48 for guiding thread of bolt. This forms a complete expandable body 40 (FIG. 6).

Figure 9:
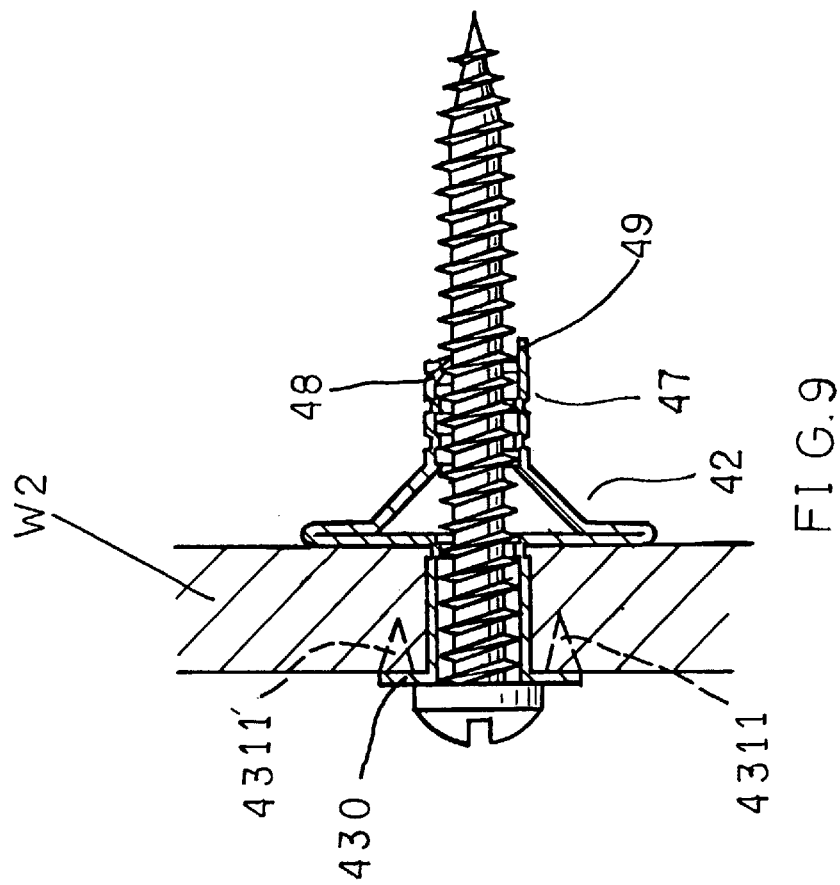
FIG. 9 is a sectional view showing the FIG. 8 expansion bolt fastened to a piece of object.
Figure 8:
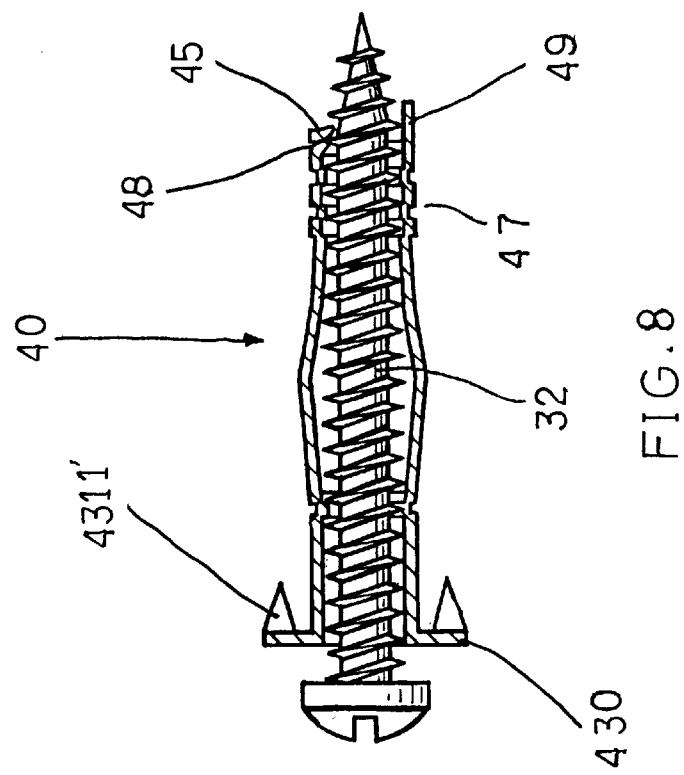
FIG. 8 is a sectional view of FIG. 6 expandable body driven through by a bolt to form an expansion bolt.

As to the operation of the second embodiment of the invention (FIGS. 8 and 9), it is substantially the same as the first embodiment, i.e., in brief, drive a bolt 32 through expandable body 40 to form an expansion bolt for securing to a piece of object W2. The only differences are that sharp member 49 is first inserted through piece of object W2 as well as the insertion of one angle of each of triangular members 4311 and 4311' into piece of object W2. This can facilitate operation and enhance securing.

Figure 11:
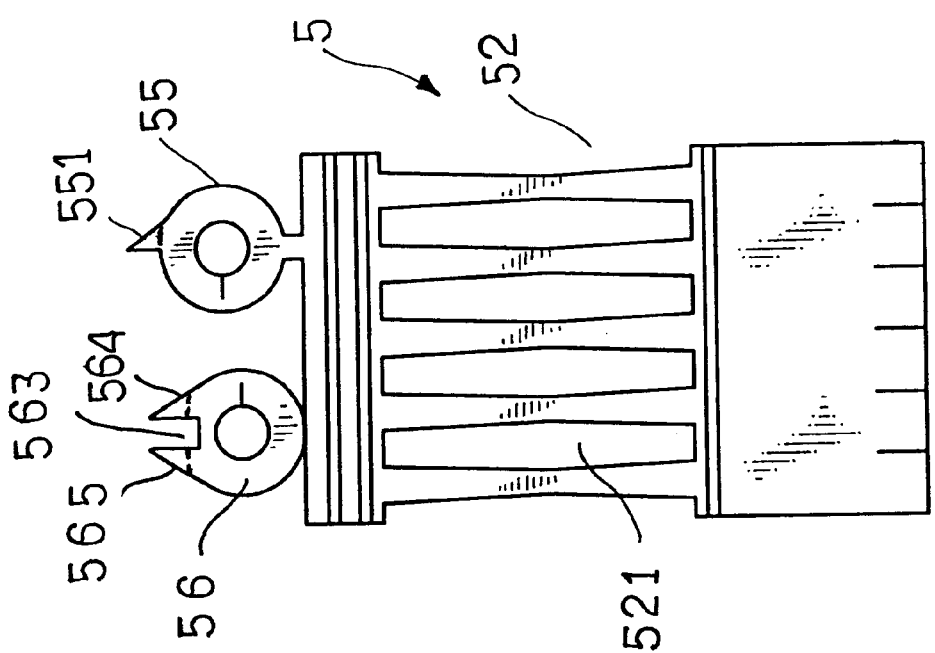
FIG. 11 is a perspective view of a metal sheet for manufacturing the FIG. 10 expandable body.
Figure 10:
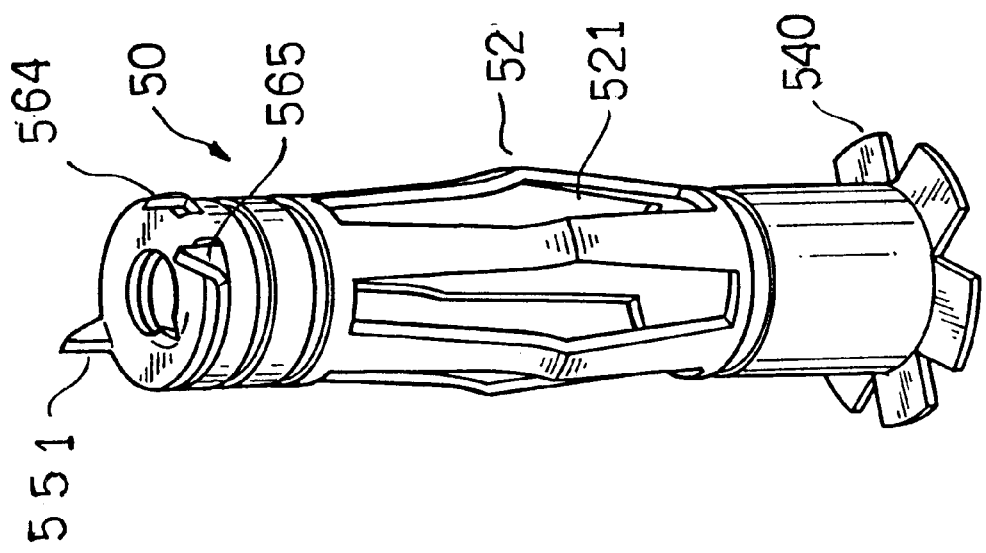
FIG. 10 is a perspective view of a third preferred embodiment of expandable body of an expansion bolt according to the invention.

Referring to FIGS. 10 and 11, there is shown a third preferred embodiment of expandable body 50 constructed in accordance with the invention. The differences between first and third embodiments are detailed below. As shown, two opposite triangular positioning members 564 and 565 are extended from sides of dent 563 of lower circular member 56 and a triangular positioning members 551 is extended from outer edge of upper circular member 55.

Figure 13:
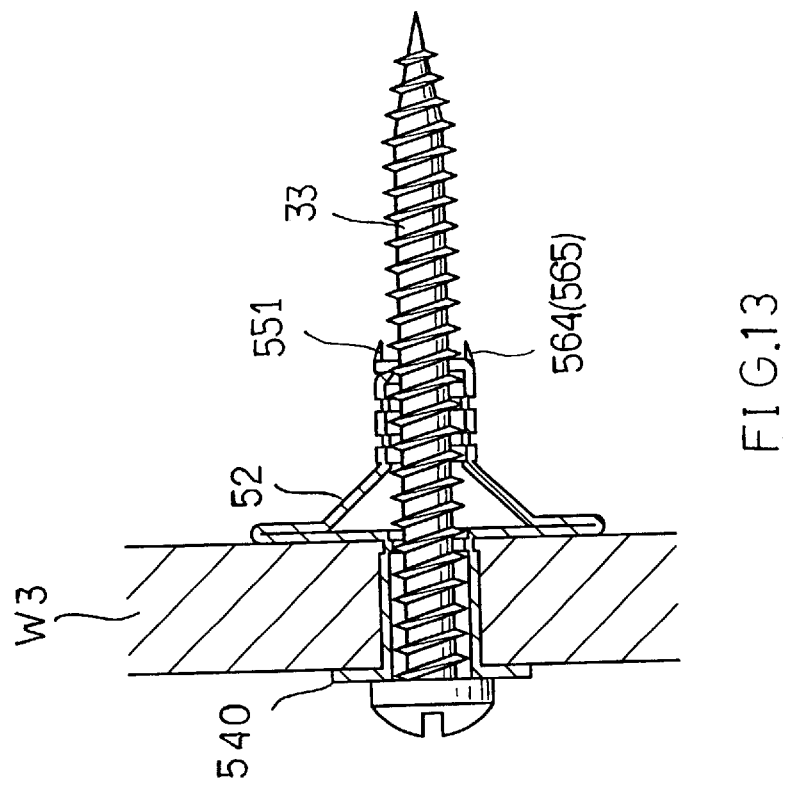
FIG. 13 is a sectional view showing the FIG. 10 expansion bolt fastened to a piece of object.
Figure 12:
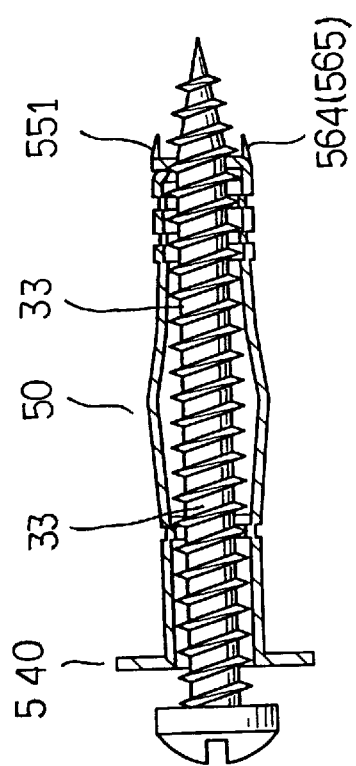
FIG. 12 is a sectional view of FIG. 10 expandable body driven through by a bolt to form an expansion bolt.

As to the operation of the third embodiment of the invention (FIGS. 12 and 13), it is substantially the same as the first embodiment, i.e., in brief, drive a bolt 33 through expandable body 50 to form an expansion bolt for securing to a piece of object W3. The only differences are that triangular positioning members 564, 565, and 551 are first inserted through piece of object W3. This can also facilitate operation and enhance securing.

Figure 15:
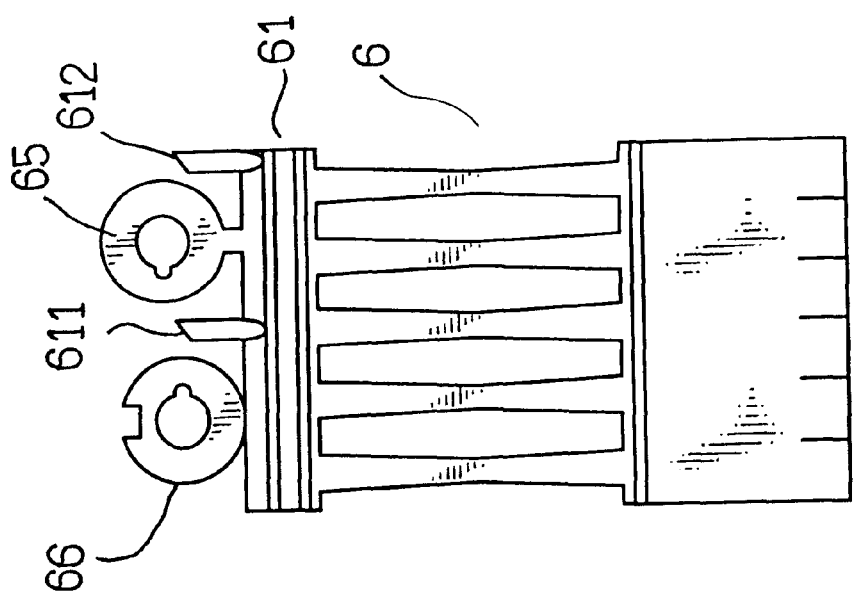
FIG. 15 is a perspective view of a metal sheet for manufacturing the FIG. 12 expandable body.
Figure 14:
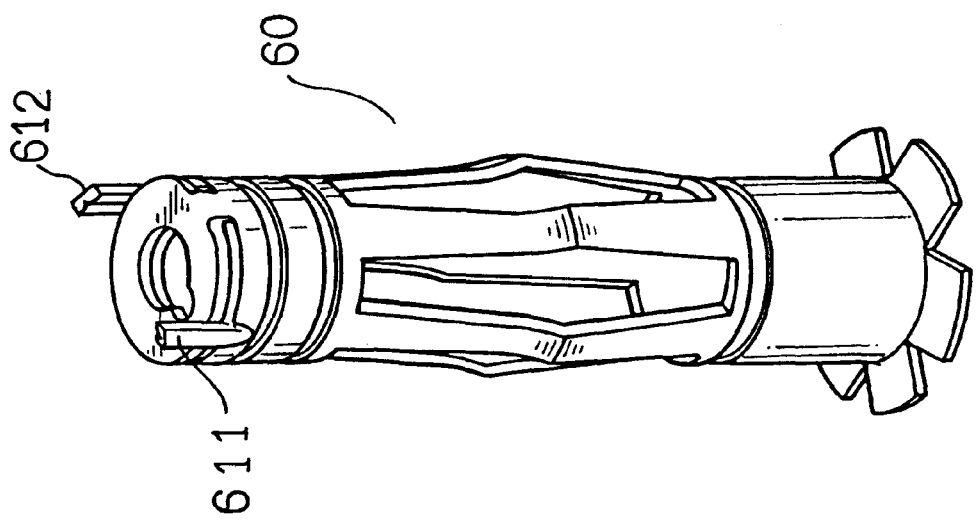
FIG. 14 is a perspective view of a fourth preferred embodiment of expandable body of an expansion bolt according to the invention.

Referring to FIGS. 14 and 15, there is shown a fourth preferred embodiment of expandable body 60 constructed in accordance with the invention. The differences between first and fourth embodiments are detailed below. As shown, two opposite positioning sharp members 611 and 612 are extended upwardly from the outer edge of upper section 61. Similar to second and third embodiments, sharp members 611 and 612 are first inserted through piece of object. This can also facilitate operation and enhance securing.

Figure 17:
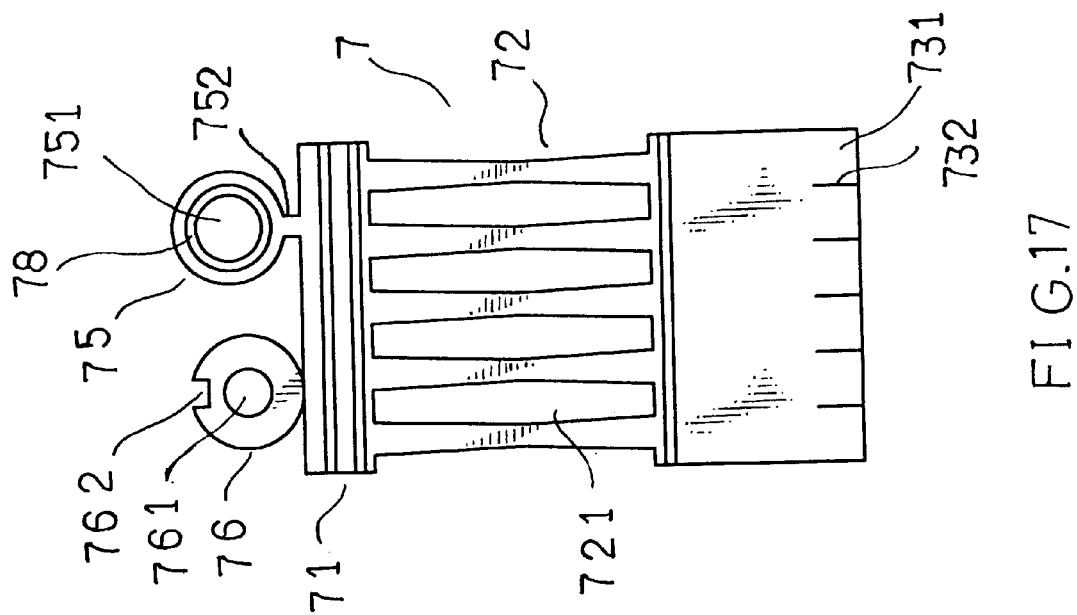
FIG. 17 is a perspective view of a metal sheet for manufacturing the FIG. 16 expandable body.
Figure 16:
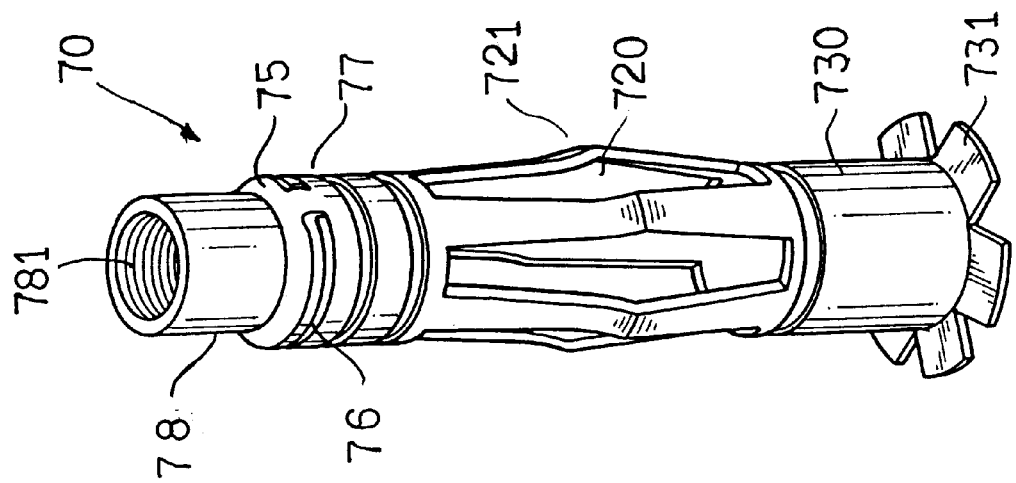
FIG. 16 is a perspective view of a fifth preferred embodiment of expandable body of an expansion bolt according to the invention.
Figure 19:
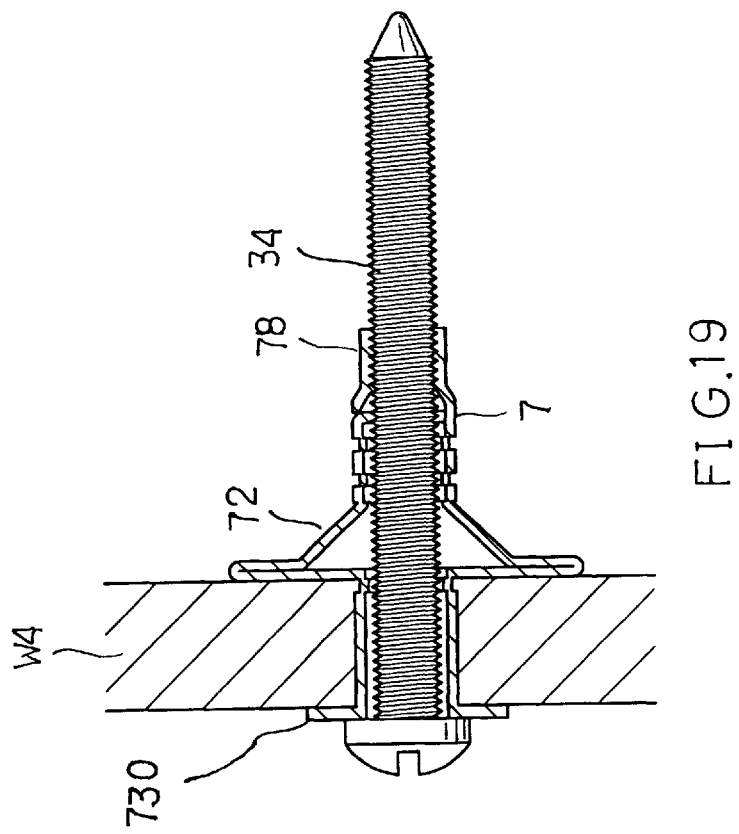
FIG. 19 is a sectional view showing the FIG. 18 expansion bolt fastened to a piece of object.
Figure 18:
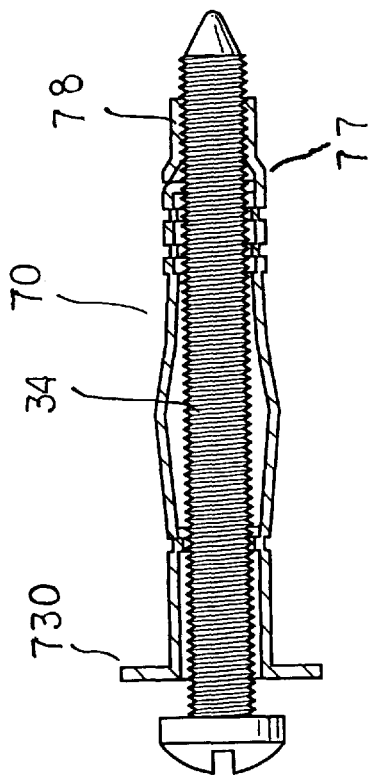
FIG. 18 is a sectional view of FIG. 16 expandable body driven through by a bolt to form an expansion bolt.

Referring to FIGS. 16 and 17, there is shown a fifth preferred embodiment of expandable body 70 constructed in accordance with the invention. The differences between first and fourth embodiments are detailed below. As shown, a sleeve 78 having an inner thread 781 is extended from central hole 751 of upper section 75. As to the operation of the fifth embodiment of the invention (FIGS. 18 and 19), it is substantially the same as the first embodiment, i.e., in brief, drive a bolt 34 through expandable body 70 to form an expansion bolt for securing to a piece of object W4. The only difference is that sleeve 78 is first inserted through piece of object W4 for guiding advancing thread of bolt 34. This can also facilitate operation and enhance securing.

Figure 21:
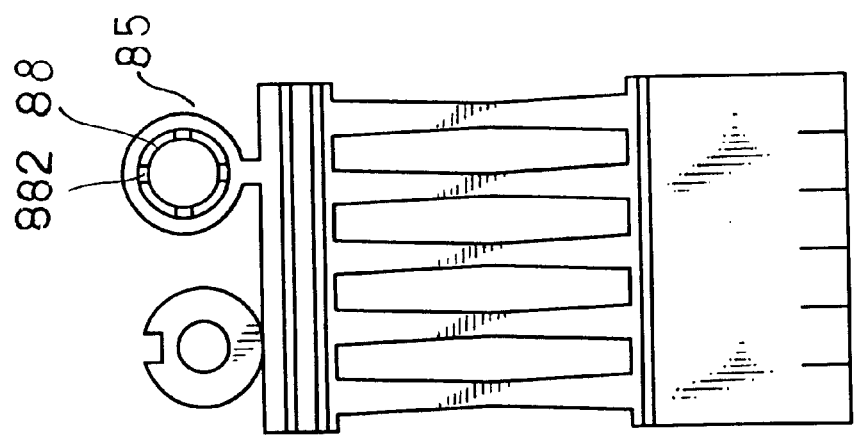
FIG. 21 is a perspective view of a metal sheet for manufacturing the FIG. 20 expandable body.
Figure 20:
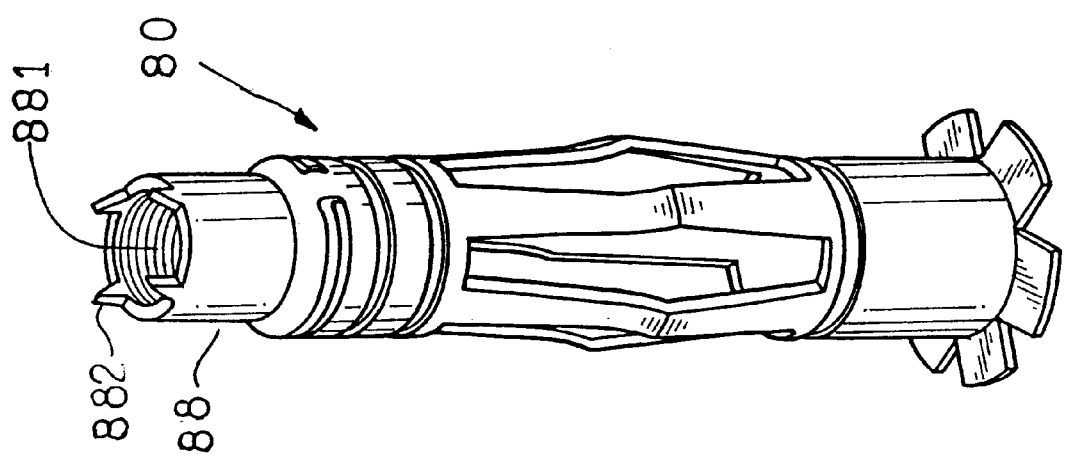
FIG. 20 is a perspective view of a sixth preferred embodiment of expandable body of an expansion bolt according to the invention.
Figure 23:
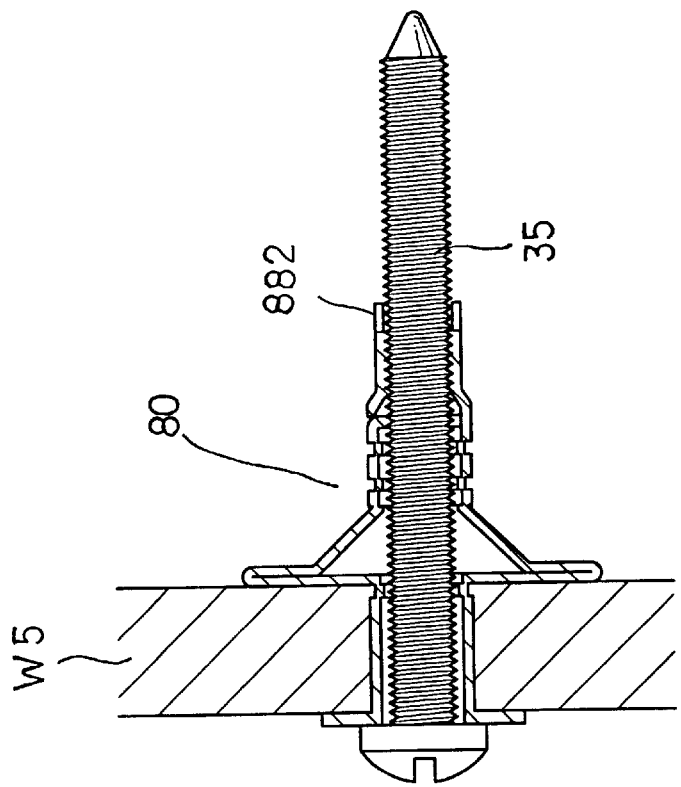
FIG. 23 is a sectional view showing the FIG. 20 expansion bolt fastened to a piece of object.
Figure 22:
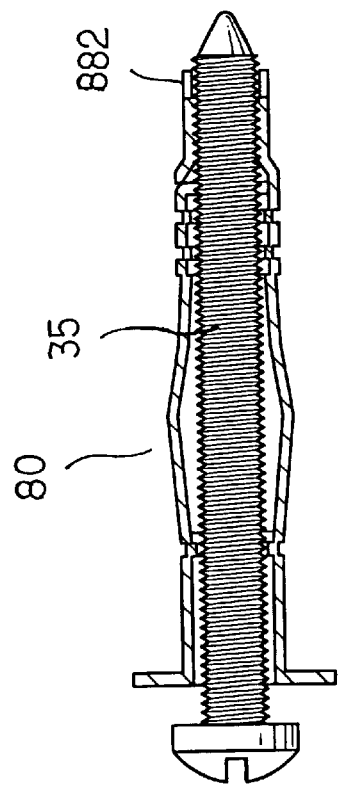
FIG. 22 is a sectional view of FIG. 20 expandable body driven through by a bolt to form an expansion bolt.

Referring to FIGS. 20 and 21, there is shown a sixth preferred embodiment of expandable body 80 constructed in accordance with the invention. The differences between fifth and sixth embodiments are detailed below. As shown, a plurality of equally spaced projected positioning member 882 (four are shown) are provided on the top edge of sleeve 88. As to the operation of the sixth embodiment of the invention (FIGS. 22 and 23), it is substantially the same as the first embodiment, i.e., in brief, drive a bolt 35 through expandable body 80 to form an expansion bolt for securing to a piece of object W5. The only difference is that projected positioning members 882 are first inserted through piece of object W5 and sleeve 88 can guide advancing thread of bolt 35. This can also facilitate operation and enhance securing.

While the invention has been described by means of specific embodiments, numerous modifications and variations could be made thereto by those skilled in the art without departing from the scope and spirit of the invention set forth in the claims.

What is claimed is:

1. An expandable metal body for an expansion bolt comprising:

a) a middle portion having a plurality of elongated longitudinal slots;

b) an upper portion including an upper circular member connected by a connection member, the upper circular member having a first central hole therethrough with a first cut extending therefrom, and a lower circular member having a second central hole therethrough, a second cut extending therefrom and an outer recess; and, c) a lower portion having a plurality of tabs on a distal end, whereby the middle portion has an annular cross-sectional configuration, the lower circular member is positioned such that the outer recess is engaged with the connection member, the upper circular member is positioned over the lower circular member such that the first and second central holes are aligned and the tabs are positioned so as to extend outwardly from the lower portion.

2. The expandable metal body of claim 1 further comprising a member having a slanted blade extending upwardly from the upper portion.

3. The expandable metal body of claim 1 further comprising a plurality of triangular members extending upwardly from the tabs.

4. The expandable metal body of claim 1 further comprising first and second triangular positioning members extending from the lower circular member on opposite sides of the recess, and a third triangular positioning member extending from the upper circular member.

5. The expandable metal body of claim 1 further comprising two members having slanted blades extending upwardly from the upper portion.

* * * * *